United States Patent [19]

Komine et al.

[11] Patent Number: 5,685,936
[45] Date of Patent: Nov. 11, 1997

[54] METHOD FOR PREPARING CARBON HONEYCOMB STRUCTURE

[75] Inventors: Takaya Komine; Kimitoshi Katoh, both of Tokyo, Japan

[73] Assignee: Showa Aircraft Industry Co., Ltd., Tokyo, Japan

[21] Appl. No.: 541,931

[22] Filed: Oct. 10, 1995

[30] Foreign Application Priority Data

Oct. 11, 1994 [JP] Japan ................................ 6-245183

[51] Int. Cl.$^6$ .................... B32B 3/12; B32B 31/04; B32B 31/12; B32B 31/18
[52] U.S. Cl. .................... 156/182; 156/197; 156/205; 156/206; 156/210; 156/250; 156/280; 156/292; 428/116
[58] Field of Search ............................... 156/280, 292, 156/182, 210, 250, 197, 205–208; 428/116, 118

[56] References Cited

U.S. PATENT DOCUMENTS

| | | | |
|---|---|---|---|
| 2,477,852 | 8/1949 | Bacon | 156/292 X |
| 2,609,315 | 9/1952 | Engel et al. | |
| 3,016,315 | 1/1962 | Robinson | 156/280 X |
| 5,514,444 | 5/1996 | Buyny et al. | 156/292 X |

FOREIGN PATENT DOCUMENTS

| | | | |
|---|---|---|---|
| 0 467 286 A1 | 1/1992 | European Pat. Off. | |
| 0 512 433 A1 | 11/1992 | European Pat. Off. | |
| 30 27 307 A1 | 2/1981 | Germany | |
| 1 318 391 | 5/1973 | United Kingdom | |
| 2058661 | 4/1981 | United Kingdom | 156/280 |
| WO 92/16362 | 10/1992 | WIPO | |

OTHER PUBLICATIONS

Derwent Publications Ltd., London, GB; AN 87–167014 & JP-A-62 099 139 (Asahi Chemical Ind KK), 8 May 1987, abstract only.

Derwent Publications Ltd., London, GB; AN 90–196911 & JP-A-02 129 233 (Kanebo KK), 17 May 1990, abstract only.

Derwent Publications Ltd., London, GB; AN 90–170331 & SU-A-1523 551 (Shubin V B), 23 Nov. 1989, abstract only.

Patent Abstracts of Japan, vol. 9, No. 88, (C–276), 17 Apr. 1985 & JP-A-59 217722 (Toray KK) 7 Dec. 1984, abstract only.

European Search Report.

*Primary Examiner*—Adrienne C. Johnston
*Attorney, Agent, or Firm*—Fish & Richardson P.C.

[57] ABSTRACT

Disclosed is a method for preparing a carbon honeycomb structure that includes the steps of: alternately stacking a plurality of corrugated sheets each of which is produced by corrugating a supporting base of carbon fibers impregnated with an epoxy resin prepolymer and then curing the prepolymer, and a plurality of flat sheets, each of which is prepared by curing a supporting base of carbon fibers impregnated with an epoxy resin prepolymer, through a node bond adhesive; curing the adhesive to form a honeycomb structure; dipping the resulting honeycomb structure in a phenolic resin prepolymer solution; evaporating the solvent; then curing the phenolic resin prepolymer; repeating these dip, evaporation and curing processes to coat the honeycomb structure with a predetermined amount of the phenolic resin; and cutting the coated honeycomb structure to a predetermined thickness. In other embodiments, instead of alternatively stacking the plurality of corrugated sheets and the plurality of flat sheets, either a plurality of the corrugated sheets are stacked or a honeycomb expanding technique is used with the supporting bases.

12 Claims, No Drawings

METHOD FOR PREPARING CARBON HONEYCOMB STRUCTURE

BACKGROUND OF THE INVENTION

The present invention relates to a novel method for preparing, at a low cost, a carbon honeycomb structure which undergoes only a slight decrease in strength even under high humidity conditions and which can be mass-produced.

The honeycomb structure comprises planar bulk materials of hollow prismatic cells, while the heat-resistant honeycomb structure is used in, for instance, peripheral machinery and tools of engines for airplanes, sandwich panels used at portions which are exposed to a high temperature and structural members used in, for instance, airplanes and space machinery and tools and have high heat resistance over a long time period in an environment or at a normal service temperature on the order of 260° C. As base materials for honeycomb structures having a light weight and high mechanical strength and excellent in specific strength with respect to weight, there have conventionally been used, for instance, aluminum foils and kraft paper, while as such base materials excellent in heat resistance as well, there have been developed, for instance, those produced by forming metal foils such as stainless steel and titanium foils into honeycomb-like structures and then subjecting the honeycomb structures to brazing process; those prepared by adhering heat-resistant resins such as resol-phenol resins to glass fibers and carbon fibers serving as base materials; and those prepared by adhering heat-resistant resins such as resol-phenol resins to synthetic heat-resistant aromatic polyamide paper serving as base materials.

However, it has been indicated that the conventional heat-resistant honeycomb structures suffer from the following drawbacks. The honeycomb structures produced by forming metal foils such as stainless steel and titanium foils into honeycomb-like structures and then subjecting the honeycomb structures to brazing process can be used at a very high normal service temperature on the order of 1000° C., but the method for the production thereof is quite complicated and does not permit mass-production with ease. The resulting honeycomb structures are very expensive. Moreover, the honeycomb structures produced by adhering heat-resistant resins such as resol-phenol resins to glass fibers and carbon fibers serving as base materials can be used at a normal service temperature on the order of 120° C., but the use of a prepreg as an ingredient makes the process for adhering base materials complicated, the method does not accordingly permit mass-production with ease and the resulting product is very expensive. In addition, the honeycomb structures produced by coating synthetic heat-resistant aromatic polyamide paper serving as base materials with heat-resistant resins such as resol-phenol resins absorb moisture under high humidity conditions and thus cause reduction of strength and therefore, the fields of applications thereof are limited. Furthermore, those produced by impregnating a supporting base of carbon fibers with a polyimide resin, curing the resin to form a honeycomb structure and then dipping the honeycomb structure in a polyimide resin solution suffer from various problems such that voids are formed due to the generation of gases during curing the resin, that the number of dipping steps increases since a solution for the dip having a high concentration cannot be used, that burrs are formed when cutting the honeycomb structure, that the effect of improving strength achieved by the dip is low since the dipping solutions used on and after the secondary dipping steps are liable to be repelled and that the production cost is high since the materials used are expensive.

SUMMARY OF THE INVENTION

Accordingly, it is an object of the present invention to provide a method for preparing a cheap honeycomb structure which undergoes only a slight decrease in strength even in a high temperature environment on the order of 120° C. and under high humidity conditions, which can be subjected to ordinary use and which may be mass-produced.

The inventors of this invention have conducted various studies to solve the problems associated with the conventional honeycomb structures, have found out that the use of a supporting base of carbon fibers impregnated with an epoxy resin prepolymer and a phenolic resin prepolymer as a component for impregnation is quite effective for accomplishing the foregoing object and thus have completed the present invention.

According to an aspect of the present invention there is provided a method for preparing a carbon honeycomb structure which comprises the steps of alternately stacking a plurality of corrugated sheets, each of which is produced by corrugating a supporting base of carbon fibers impregnated with an epoxy resin prepolymer and then curing the prepolymer, and a plurality of flat sheets, each of which is prepared by impregnating a supporting base of carbon fibers with an epoxy resin prepolymer and then curing the prepolymer, through a node bond adhesive; curing the adhesive to form a honeycomb structure; dipping the resulting honeycomb structure in a solution of a phenolic resin prepolymer in a solvent; evaporating the solvent; then curing the phenolic resin prepolymer; repeating these dip, evaporation and curing processes to coat the honeycomb structure with a predetermined amount of the phenolic resin; and cutting the honeycomb structure carrying the cured phenolic resin to a predetermined thickness.

According to a second aspect of the present invention, there is provided a method for preparing a carbon honeycomb structure which comprises the steps of stacking a plurality of corrugated sheets, each of which is produced by corrugating a supporting base of carbon fibers impregnated with an epoxy resin prepolymer and then curing the prepolymer, through a node bond adhesive; curing the adhesive to form a honeycomb structure; dipping the resulting honeycomb structure in a solution of a phenolic resin prepolymer in a solvent; evaporating the solvent; then curing the phenolic resin prepolymer; repeating these dip, evaporation and curing processes to coat the honeycomb structure with a predetermined amount of the phenolic resin; and cutting the honeycomb structure carrying the cured phenolic resin to a predetermined thickness.

According to a third aspect of the present invention, there is provided a method for preparing a carbon honeycomb structure through so-called expanding technique which comprises the steps of applying a node bond adhesive to a supporting base of carbon fibers impregnated with an epoxy resin prepolymer; stacking a plurality of the supporting bases; curing the adhesive; then expanding the stacked bases and curing the epoxy resin prepolymer with heating to form a honeycomb structure; further dipping the resulting honeycomb structure in a solution of a phenolic resin prepolymer in a solvent; evaporating the solvent; then curing the phenolic resin prepolymer; repeating these dip, evaporation and curing processes to coat the honeycomb structure with a predetermined amount of the phenolic resin; and cutting the honeycomb structure carrying the cured phenolic resin to a predetermined thickness.

DESCRIPTION OF THE PREFERRED EMBODIMENTS

The present invention will hereinafter be explained in more detail.

The supporting bases of carbon fibers used in the present invention may be, for instance, woven fabrics, knitting fabrics and nonwoven fabrics, more specifically, 1K plain weave fabrics of carbon fibers such as polyacrylonitrile carbon fibers. The supporting base suitably has a thickness generally ranging from about 0.1 to 0.5 mm and a width ranging from about 250 to 350 mm.

The supporting base of carbon fibers is impregnated with an epoxy resin prepolymer. The amount thereof to be impregnated into the supporting base suitably ranges from 30 to 40% by weight as expressed in terms of the solid content thereof. Preferred examples of such epoxy resin prepolymers are those represented by the following general formula (1):

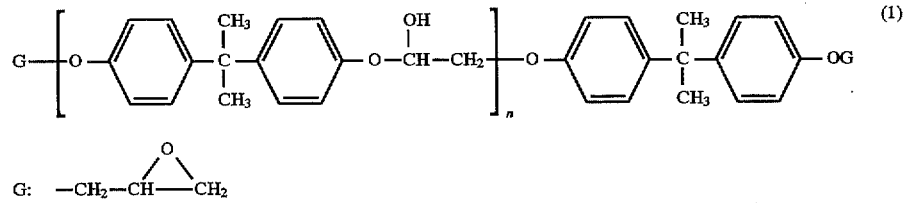

wherein n is a numerical value ranging from 1 to 2.

First of all, the first method according to the crrugating technique will be detailed below.

The supporting base of carbon fibers impregnated with the epoxy resin prepolymer is subjected to corrugating using corrugated rolls according to the usual method. The height and width of each corrugation of the resulting corrugated sheet suitably range from 2 to 3 mm and the pitch thereof suitably ranges from 8 to 9 mm. The supporting base thus formed is heated at a temperature ranging from, for instance, about 170° to 220° C. for about 60 to 120 minutes to harden the epoxy resin prepolymer and to thus form a corrugated sheet. Separately, a flat sheet is prepared by curing an epoxy resin prepolymer which is impregnated into a carbon fiber base fabric. Then a plurality (for instance, about 150 to 400 sheets each) of the corrugated sheets to which a node bond adhesive is adhered on the crest portions of the corrugations in an amount ranging from about 120 to 200 g/m² and the flat sheets (free of corrugations) are alternately stacked and then the resulting stacked sheets are heated at a temperature ranging from about 220° to 280° C. for about 1 to 3 hours while applying a pressure of about 0.5 to 2 kg/cm² to harden the adhesive to form a honeycomb structure. Examples of solvents used in the node bond adhesive are preferably N-methyl-2-pyrrolidone and dimethylformamide.

Next, the second preparation method accoding to the corrugating technique will be detailed below.

The supporting base of carbon fibers impregnated with the epoxy resin prepolymer is subjected to a corrugating process using corrugated rolls according to the usual method. The height and width of each corrugation of the resulting corrugated sheet suitably range from 2 to 3 mm and the pitch thereof suitably ranges from 8 to 9 mm. The supporting base thus formed is heated at a temperature ranging from, for instance, about 170° to 220° C. for about 60 to 120 minutes to harden the epoxy resin prepolymer and to thus form a corrugated sheet. Then a plurality (for instance, about 150 to 400 sheets) of the corrugated sheets to which a node bond adhesive is adhered on the crest portions of the corrugations in an amount ranging from about 120 to 200 g/m² are alternately stacked and then the resulting stacked sheets are heated at a temperature ranging from about 220° to 280° C. for about 1 to 3 hours while applying a pressure of about 0.5 to 2 kg/cm² to harden the adhesive to form a honeycomb structure. Examples of solvents used in the node bond adhesive are preferably N-methyl-2-pyrrolidone and dimethylformamide.

In the foregoing first and second methods, the cured stacked sheets, i.e., the honeycomb structure prepared above are then dipped in a solution of a phenolic resin prepolymer in a solvent, followed by evaporating the solvent and then curing the phenolic resin prepolymer. Examples of solvents used for preparing the solution of the phenolic resin prepolymer are preferably acetone and methyl ethyl ketone. These dip, evaporation and curing processes are repeated till the amount of the coated prepolymer reaches about 30 to 120 kg/m³ as expressed in terms of the solid content thereof. It is sufficient that the evaporation of the solvent is carried out at a temperature ranging from 60° to 100° C. for about 10 to 60 minutes and that the curing process is carried out at 150° to 200° C. for about 30 to 60 minutes.

The dipping solution of the phenolic resin prepolymer has a low viscosity and therefore, the solution having a relatively high concentration may be used in the dipping process. This permits the reduction of the repeating time of the foregoing dip, evaporation and curing processes to about 5 to 10 times as compared with that required when the conventional prepolymer is used (15 to 20 times).

Thereafter, the resulting honeycomb structure thus prepared is cut to a desired thickness, for instance, 0.5 to 3 inches (12 to 38 mm) to give the carbon honeycomb structure of the present invention.

Then the expanding method will be explained in more detail below.

A node bond adhesive such as a cold curing epoxy resin or a cold curing resorcinol/formaldehyde resin type adhesive is applied to a supporting base of carbon fibers impregnated with an epoxy resin prepolymer, followed by stacking a plurality (for instance, 300 to 400 sheets) of the adhesive-impregnated supporting base, curing the adhesive, then expanding the stacked bases, curing the epoxy resin prepolymer with heating to form a honeycomb structure, dipping the honeycomb structure in a solution of a phenolic resin prepolymer in a solvent, evaporating the solvent, curing the prepolymer, then repeating the dip, evaporation and curing processes over a predetermined time to thus coat the honeycomb structure with the phenolic resin in a predetermined amount defined above in connection with the first and second methods and cutting it to a predetermined thickness to give a carbon honeycomb structure.

The present invention makes use of a supporting base of carbon fibers impregnated with an epoxy resin prepolymer, and a phenolic resin prepolymer as a component for coating. Therefore, the resulting honeycomb structure of the invention has slightly low heat resistance, but requires low cost for materials, shows only slight reduction in the strength, in particular, the strength under high humidity conditions and excellent in thermoformability, as compared with the honeycomb structure obtained using a supporting base of carbon fibers impregnated with a polyimide prepolymer. Moreover, a dipping solution having a high concentration can be used and as a result, the number of steps required for the dip may substantially be reduced. Furthermore, the dipping solution is never repelled even if the dipping steps are repeatedly carried out. In addition, only a small quantity of burrs are formed when cutting the carbon honeycomb structure after the final curing treatment. The carbon honeycomb structure of the present invention cannot be bent at room temperature at all, but if it is heated to a temperature of about 320° C., the resin is softened and thus the structure can be formed into an article having curved surface.

The present invention will hereinafter be described in more detail with reference to the following non-limitative working Examples and the effects practically attained by the invention will also be discussed in detail in comparison with Comparative Example.

EXAMPLE 1

A supporting base of carbon fibers (1K plain weave; density (thread count): 906/m for both warp and weft directions; thickness: 0.16 mm) having a width of 325 mm and a length of 1700 mm was impregnated with an epoxy resin prepolymer (liquid) represented by Formula (1) in such an amount that the content of the prepolymer in the base was 35% by weight. The supporting base of carbon fibers impregnated with the epoxy resin prepolymer was subjected to a corrugating treatment using corrugated rolls according to the usual method. The height and width of the corrugations of the resulting corrugated sheet were set at 3 mm and the pitch thereof was set at 9 mm. The sheet thus formed was heated to 200° C. for 60 minutes to harden the prepolymer to give a corrugated sheet. Separately, the same supporting base of carbon fibers (width: 325 mm; length: 1240 mm) was impregnated with the same epoxy resin prepolymer by the same method used above and then hardened by the same method used above to give a flat sheet. Then a polyimide type node bond adhesive was applied to the corrugations of the corrugated sheet in an amount of 200 g/m² and a plurality (350 sheets each) of the corrugated sheets and the flat sheets (free of corrugations) were alternately stacked, followed by heating at 250° C. for 2 hours while applying a pressure of 1 kg/cm² to harden the adhesive to form a honeycomb structure.

The hardened honeycomb structure thus prepared was then dipped in a solution of a phenolic resin prepolymer (a 40% by weight solution in acetone) (37 cps: at 25° C.), followed by heating at 90° C. for 30 minutes to thus evaporate the solvent and heating at 180° C. for 45 minutes to harden the prepolymer. These dip, evaporation and hardening steps were repeated 8 times so that the amount of the prepolymer reached 70 kg/m³ as expressed in terms of the solid content thereof. The phenolic resin prepolymer used herein was "Phenolite 5900" (trade name of a product available from Dainippon Ink and Chemicals, Inc.).

The resulting product was cut to a thickness of 12.7 mm to give carbon honeycomb structure according to the present invention.

EXAMPLE 2

A supporting base of carbon fibers (1K plain weave; density (thread count): 906/m for both warp and weft directions; thickness: 0.16 mm) having a width of 325 mm and a length of 1700 mm was impregnated with an epoxy resin prepolymer (liquid) represented by Formula (1) in such an amount that the content of the prepolymer was 35% by weight. The carbon fiber base fabric impregnated with the epoxy resin prepolymer (liquid) was subjected to a corrugating treatment using corrugated rolls according to the usual method. The height and width of the corrugations of the resulting corrugated sheet were set at 3 mm and the pitch thereof was set at 9 mm. The sheet thus formed was heated to 200° C. for 60 minutes to harden the prepolymer to give a corrugated sheet. Then a polyimide type node bond adhesive was applied to the corrugations of the corrugated sheets in an amount of 200 g/m² and 350 sheets of the corrugated sheets were alternately stacked while shifting by a half pitch for every sheet so that the crests of the corrugations are joined with the troughs of the neighbouring corrugated sheet, followed by heating at 250° C. for 2 hours while applying a pressure of 1 kg/cm² to harden the adhesive to form a honeycomb structure.

The hardened honeycomb structure thus prepared was then dipped in a solution of a phenolic resin prepolymer (a 40% by weight solution in acetone) (37 cps: at 25° C.), followed by heating at 90° C. for 30 minutes to thus evaporate the solvent and heating at 180° C. for 45 minutes to harden the prepolymer. These dip, evaporation and hardening steps were repeated 8 times so that the amount of the prepolymer reached 70 kg/m³ as expressed in terms of the solid content thereof. The phenolic resin prepolymer used herein was "Phenolite 5900" (trade name of a product available from Dainippon Ink and Chemicals, Inc.).

The resulting product was cut to a thickness of 12.7 mm to give carbon honeycomb structure according to the present invention.

COMPARITIVE EXAMPLE

The same procedures used in Example 1 were repeated except that the aromatic carboxylic anhydride represented by the following formula (2) and a polyimide prepolymer obtained from the diamine represented by the following formula (3) were substituted for the node bond adhesive and the dipping resin solution [i.e., "Phenolite 5900" (trade name of a product available from Dainippon Ink and Chemicals, Inc.)] used in Example 1, respectively to give comparative honeycomb structures.

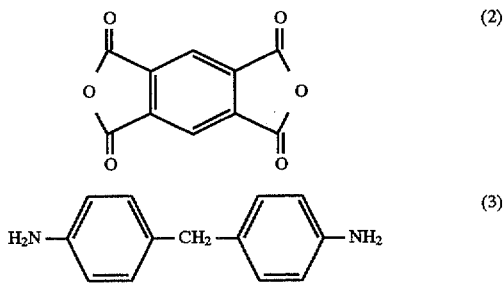

The honeycomb structures prepared in Example 1 and Comparative Example are excellent in corrosion resistance (weight change in salt-spray test), compressive strength and bending strength (strength observed after allowing to stand at 60° C., 85% RH for 30 days) as compared with the conventional honeycomb structures (⅛ inch regular hexagon honeycomb structures) of aluminum and Nomex (mixed paper of an aromatic polyamide). Moreover, the honeycomb structure prepared in Example 1 is excellent in compressive strength and bending strength as compared with that prepared in Comparative Example. The results are summarized in the following Table.

TABLE

| | Corrosion Resistance | Compressive Strength | Bending Strength |
|---|---|---|---|
| Example 1 | A | A | A |
| Comparative Example | A | B | B |
| Al-Honeycomb Structure | C | B | B |
| Nomex-Honeycomb Structure | B | C | C |

A: excellent; B: mediocre; C: not good

What is claimed is:

1. A method for preparing a carbon honeycomb structure comprising the steps of alternately stacking a plurality of corrugated sheets, each of which is produced by corrugating a supporting base of carbon fibers impregnated with an epoxy resin prepolymer and then curing the prepolymer, and a plurality of flat sheets, each of which is prepared by impregnating a supporting base of carbon fibers with an epoxy resin prepolymer and then curing the prepolymer, through a node bond adhesive; curing the adhesive to form a honeycomb structure; dipping the resulting honeycomb structure in a solution of a phenolic resin prepolymer in a solvent; evaporating the solvent; then curing the phenolic resin prepolymer; repeating these dip, evaporation and curing processes to coat the honeycomb structure with a predetermined amount of the phenolic resin; and cutting the honeycomb structure carrying the cured phenolic resin to a predetermined thickness.

2. The method of claim 1 wherein the supporting base of carbon fibers is a supporting base of polyacrylonitrile carbon fibers.

3. The method of claim 1 wherein the supporting base of carbon fibers is a woven fabric.

4. The method of claim 1 wherein the epoxy resin prepolymer is represented by the following general formula (1):

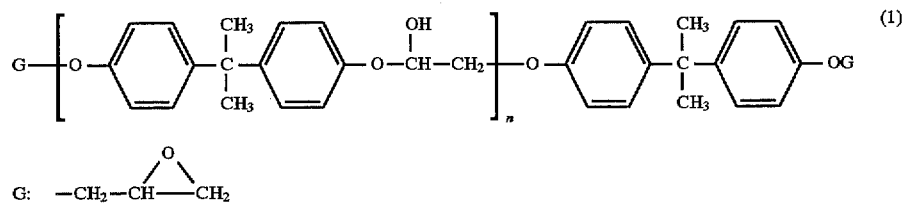

wherein n is a numerical value ranging from 1 to 2.

5. A method for preparing a carbon honeycomb structure comprising the steps of stacking a plurality of corrugated sheets, each of which is produced by corrugating a supporting base of carbon fibers impregnated with an epoxy resin prepolymer and then curing the prepolymer, through a node bond adhesive; curing the adhesive to form a honeycomb structure; dipping the resulting honeycomb structure in a solution of a phenolic resin prepolymer in a solvent; evaporating the solvent; then curing the phenolic resin prepolymer; repeating these dip, evaporation and curing processes to coat the honeycomb structure with a predetermined amount of the phenolic resin; and cutting the honeycomb structure carrying the cured phenolic resin to a predetermined thickness.

6. The method of claim 5 wherein the supporting base of carbon fibers is a supporting base of polyacrylonitrile carbon fibers.

7. The method of claim 5 wherein the supporting base of carbon fibers is a woven fabric.

8. The method of claim 5 wherein the epoxy resin prepolymer is represented by the general formula (1):

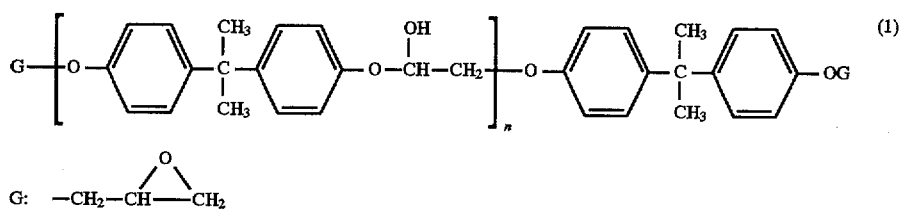

9. A method for preparing a carbon honeycomb structure comprising the steps of applying a node bond adhesive to a supporting base of carbon fibers impregnated with an epoxy resin prepolymer; stacking a plurality of the supporting bases; curing the adhesive; then expanding the stacked bases and curing the epoxy resin prepolymer with heating to form a honeycomb structure; further dipping the resulting honeycomb structure in a solution of a phenolic resin prepolymer in a solvent; evaporating the solvent; then curing the phenolic resin prepolymer; repeating these dip, evaporation and curing processes to coat the honeycomb structure with a predetermined amount of the phenolic resin; and cutting the honeycomb structure carrying the cured phenolic resin to a predetermined thickness.

10. The method of claim 9 wherein the supporting base of carbon fibers is a supporting base of polyacrylonitrile carbon fibers.

11. The method of claim 9 wherein the supporting base of carbon fibers is a woven fabric.

12. The method of claim 9 wherein the epoxy resin prepolymer is represented by the general formula (1):

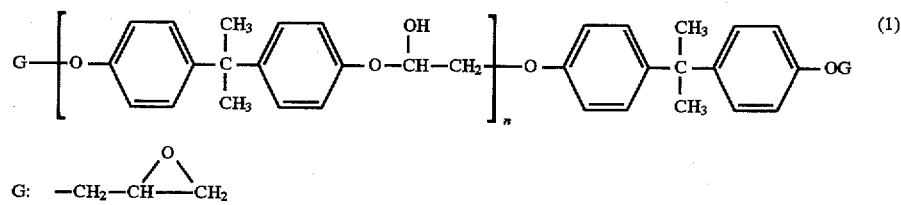

* * * * *